US008662394B2

(12) United States Patent
Bonnet et al.

(10) Patent No.: US 8,662,394 B2
(45) Date of Patent: Mar. 4, 2014

(54) DEVICE FOR PROTECTING AN ELECTRONIC COMPONENT

(75) Inventors: Eric Bonnet, Malissard (FR); Alain Eck, Montmeyran (FR); Vincent Hernandez, Oytier St Oblas (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 1070 days.

(21) Appl. No.: 12/503,478

(22) Filed: Jul. 15, 2009

(65) Prior Publication Data
US 2010/0102127 A1 Apr. 29, 2010

(30) Foreign Application Priority Data
Jul. 16, 2008 (FR) ...................... 08 54835

(51) Int. Cl.
*G06K 7/00* (2006.01)
(52) U.S. Cl.
USPC ............................. 235/439; 235/441; 713/194
(58) Field of Classification Search
USPC .................. 235/439, 441; 361/760, 535, 748; 713/194; 726/34
See application file for complete search history.

(56) References Cited

U.S. PATENT DOCUMENTS 4,394,707 A * 7/1983 Consoli .......................... 361/750
5,233,505 A * 8/1993 Chang et al. .................. 361/785
7,978,070 B2 * 7/2011 Hunter ........................ 340/545.6
2006/0259788 A1 * 11/2006 Elbert et al. .................. 713/194
2008/0192446 A1 * 8/2008 Hankofer et al. ............. 361/752

FOREIGN PATENT DOCUMENTS

| DE | 10312654 A1 | 10/2004 | |
| EP | 1674962 A | 6/2006 | |
| FR | 2806507 A | 9/2001 | |
| FR | 2860643 A | 4/2005 | |
| FR | 2901896 A | 12/2007 | |
| WO | WO2008145881 * | 4/2008 | ............... H05K 5/02 |
| WO | 2008145881 A | 12/2008 | |

OTHER PUBLICATIONS

French Search Report issued Feb. 18, 2009 for French Patent Application No. 0854835.

* cited by examiner

*Primary Examiner* — Sonji Johnson
(74) *Attorney, Agent, or Firm* — Vedder Price PC

(57) ABSTRACT

An electronic system comprising a printed circuit having first and second opposite surfaces, an electronic component attached to the second surface and a first device of protection against access attempts on the first surface side. The system comprises a second protection device at least partially covering, on the second surface side, the electronic component, and comprising at least one tab. The printed circuit comprises at least one through opening, the tab extending in the opening and being attached to the printed circuit. The tab comprises at least one conductive portion electrically contacting at least one first conductive track of the first surface.

9 Claims, 4 Drawing Sheets

DEVICE FOR PROTECTING AN ELECTRONIC COMPONENT

BACKGROUND OF THE INVENTION

1. Field of the Invention

The present invention relates to a device for protecting an electronic component, for example, an electronic component attached to a printed circuit, to avoid any access to said electronic component or to data contained in said electronic component.

2. Discussion of the Related Art

Certain electronic circuits, for example, a chip card or magnetic card reader, comprise a printed circuit contained in a package. Electronic components may be soldered on both surfaces of the printed circuit. The system for example is a display screen, a serial connector, a connector intended to be connected to the telephone network, a memory card connector, etc. The printed circuit surface on which the display screen is attached is called the front surface and the printed circuit surface opposite to the front surface is called the rear surface.

The safety regulations prescribed by approval bodies generally impose to provide protection devices enabling to prevent the access to certain electronic components attached to the printed circuit. In particular, for certain electronic components attached to the rear surface of the printed circuit, safety regulations may impose the presence of specific protection devices for these components. Indeed, such components are more "sensitive" to fraud attempts since a user who manipulates the electronic system generally faces the screen and may not notice that a fraud attempt has been performed by drilling of the package on the rear surface side of the printed circuit.

An example of a protection device conventionally used to protect an electronic component such as a memory card connector comprises a rigid cage, attached to the printed circuit, which covers the connector while enabling access to the connector for the introduction of memory cards. The internal surfaces of the cage may be covered with a flexible protection circuit formed of the stacking of several flexible films between which are arranged interconnected conductive tracks, and forming at least one safety circuit. The safety circuit is connected at its ends to a processing system, provided at the printed circuit level. The processing system is capable of detecting the rupture of a conductive track of the safety circuit, which may correspond to an intrusion attempt.

The connections between the cage and the printed circuit may be arranged between the electronic component protected by the cage and the printed circuit so that they are not accessible. A disadvantage is that it is then not possible to assemble or disassemble the cage independently from the electronic component. It may however be desirable, in the case where the cage does not function properly, to be able to remove the cage independently from the electronic component to replace it with a cage which functions properly. For this purpose, the connections between the cage and the printed circuit may be arranged at the cage periphery to assemble or disassemble the cage independently from the electronic component. However, in this case, the connections between the cage and the printed circuit can be accessible from the outside of the cage. Someone could then short-circuit the safety circuit of the cage via these connections to be able to remove the cage without for this to be detected by the printed circuit processing system. The electronic component would then be accessible.

Document DE-A-10312654 describes a protection system in which a cap covering an electronic circuit is assembled to the printed circuit supporting the circuit by non-conductive pins engaged in holes of the printed circuit.

SUMMARY OF THE INVENTION

Another object is to obtain a protection device which is particularly simple to manufacture and which can be manufactured at reduced cost.

To achieve all or part of these objects as well as others, an aspect of the present invention provides an electronic system comprising a printed circuit having first and second opposite surfaces and at least one through opening, an electronic component attached to the second surface and a first device of protection against access attempts on the first surface side. The system comprises a second protection device at least partially covering, on the second surface side, the electronic component, and comprising at least one tab extending in the through opening and attached to the printed circuit. The tab comprises at least one conductive portion electrically contacting at least one first conductive track of the first surface.

According to an embodiment of the present invention, the tab protrudes from the opening on the first surface side, is turned back against the first surface, and is attached to the first surface at one end.

According to an embodiment of the present invention, the tab is attached to the walls of the opening.

According to an embodiment of the present invention, the second protection device comprises at least one first conductive track. The printed circuit comprises at least one second conductive track, the first conductive track being connected to the second conductive track at the level of the tab.

According to an embodiment of the present invention, the second protection device comprises at least one flexible film comprising third and fourth opposite surfaces, the third surface being oriented towards the connector. The first conductive track is arranged on the third surface.

According to an embodiment of the present invention, the second protection device comprises a conductive layer covering the fourth surface.

According to an embodiment of the present invention, the first protection device comprises an additional flexible film at least partially covering the first surface of the printed circuit and at least one third conductive track extending on the additional flexible film at least at the level of the mounting between the tab and the printed circuit, the printed circuit comprising at least one fourth conductive track, the third conductive track being connected to the fourth conductive track.

According to an embodiment of the present invention, the printed circuit is contained in a package and the first protection device comprises a mobile or deformable element comprising a first conductive portion. The printed circuit comprises second and third conductive portions at least partially facing the first conductive portion. The mobile element is capable of being moved or deformed between a first position, in the presence of the package, in which the first conductive portion is in contact with the second and third conductive portions and a second position, when the package is at least partially open, in which the contact between the first conductive portion and the second and third conductive portions is interrupted.

According to an embodiment of the present invention, the system is an electronic payment terminal.

Another aspect of the present invention provides a method for manufacturing a payment terminal such as defined previously, comprising the steps of forming the second protection device, attaching the electronic component to the second surface of the printed circuit, placing the second protection device on the second surface by introducing the tab into the opening, the second protection device at least partially covering the electronic component, of attaching the tab to the printed circuit on the side of the first surface and of placing the first protection device on the first surface side.

According to an embodiment of the present invention, the step of forming the second protection device is carried out by folding of a flexible printed circuit.

The foregoing objects, features, and advantages of the present invention will be discussed in detail in the following non-limiting description of specific embodiments in connection with the accompanying drawings.

DETAILED DESCRIPTION

Figure 1:
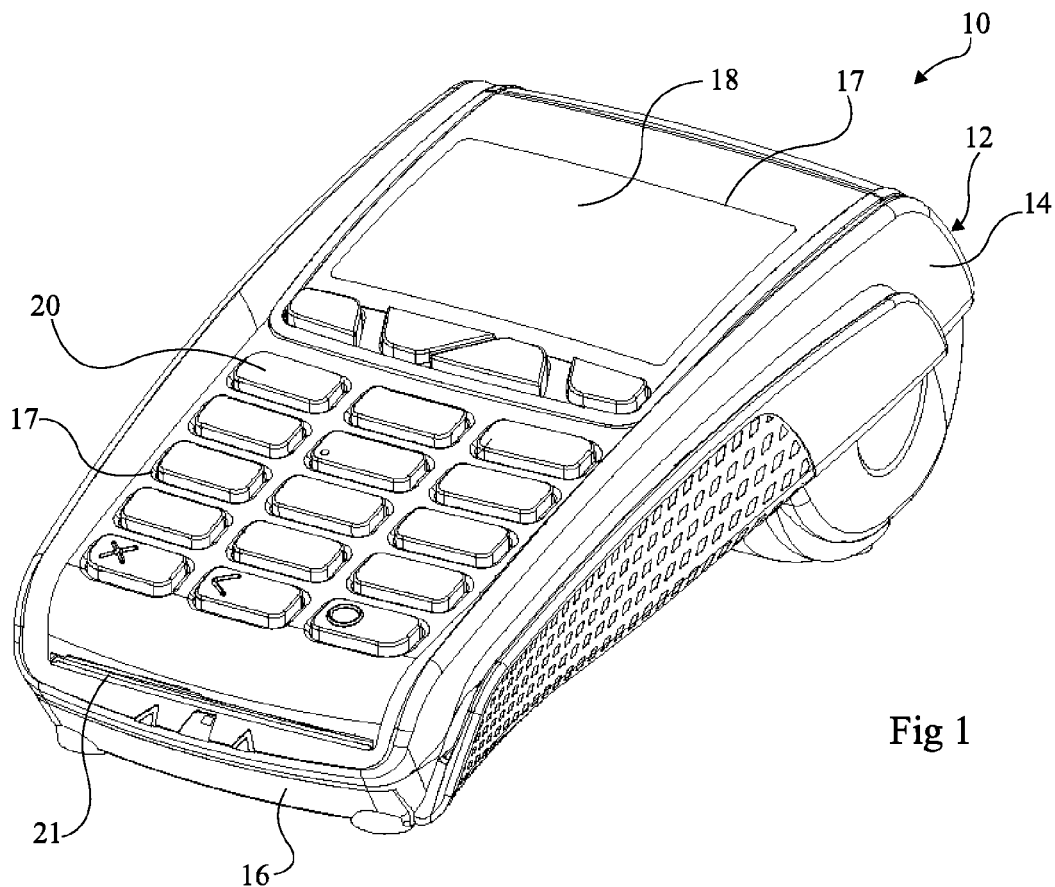
FIG. 1 is a perspective view of a payment terminal according to an embodiment of the present invention.

For clarity, the same elements have been designated with the same reference numerals in the different drawings. Further, only those elements which are necessary to the understanding of the present invention will be described.

The present invention comprises, for an electronic system comprising a printed circuit having first and second opposite surfaces, components being provided on the first surface and being protected by a first protection device and a second component being attached to the second surface and being protected by a second protection device corresponding to a cage, connecting the cage to the printed circuit by soldering, not on the second surface side but on the first surface side. For this purpose, the printed circuit comprises through openings enabling the passing of at least one portion of the cage. The connection solders of the cage being performed on the first surface side, they benefit from the protection of the first protection device and are thus make it difficult for an unauthorized person to access them. Further, the cage may be assembled or disassembled independently from the electronic component that it protects.

FIG. 1 schematically shows an embodiment of an electronic system 10, for example, an electronic payment terminal. Terminal 10 comprises a package 12 formed of an upper package portion 14 connected to a lower package portion 16. Openings 17 are provided at the level of upper package portion 14 for a display screen 18 and keys 20 belonging, for example, to a keyboard. Further, an opening 21 is provided in package 12 to enable the introduction of cards, for example, bank cards.

Figure 2:
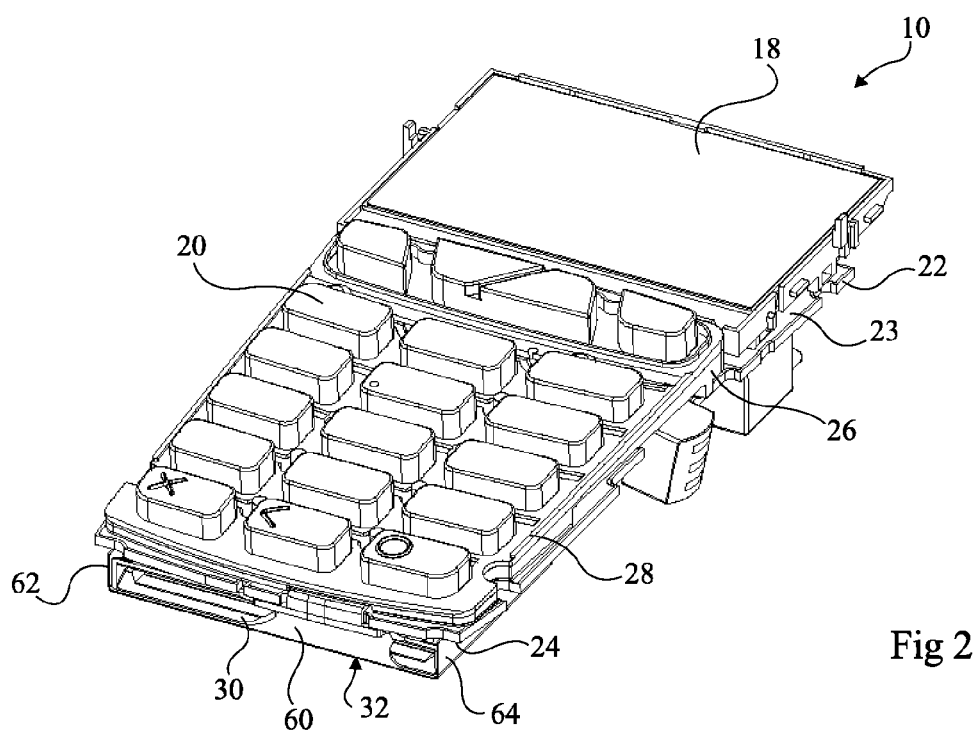
FIGS. 2 and 3 are perspective views of internal components of the payment terminal of FIG. 1.
Figure 3:
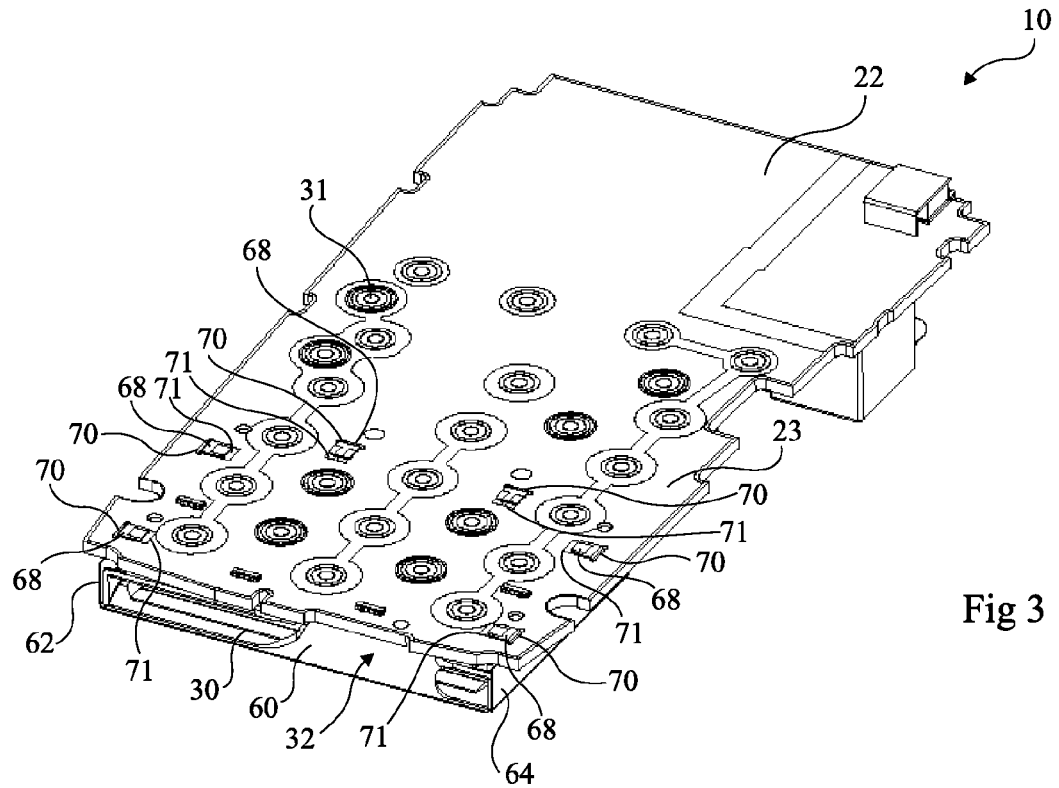
Figure 4:
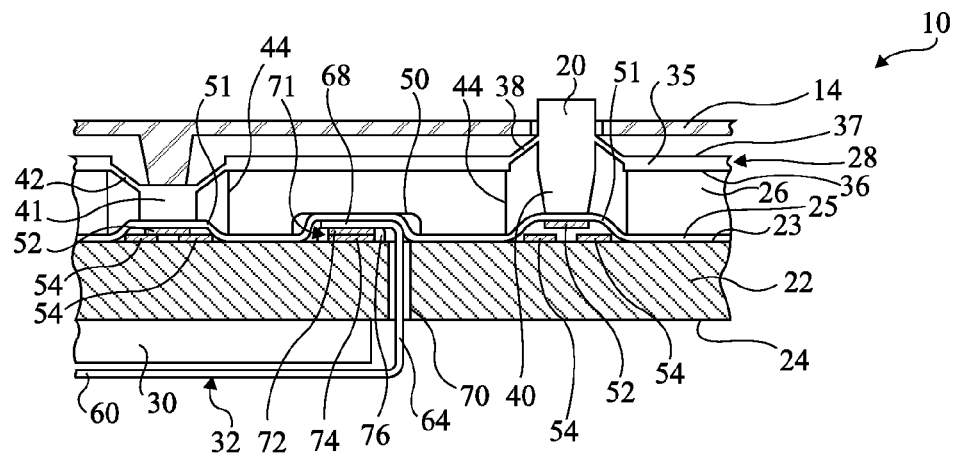
FIG. 4 is a partial simplified cross-section view of the payment terminal of FIG. 1.

FIGS. 2 and 3 are perspective views of internal components of the payment terminal of FIG. 1, certain components shown in FIG. 2 being absent from FIG. 3. FIG. 4 is partial simplified cross-section view of terminal 10.

Terminal 10 comprises a printed circuit 22 on which electronic components are connected. Printed circuit 22 comprises two opposite surfaces 23, 24. Surface 23 is partially covered with a flexible protection circuit 25, itself covered with a spacer 26. Screen 18 is arranged on the side of surface 23. Spacer 26 is covered with a flexible membrane 28 forming a keyboard, at the level of which keys 20 are formed. In FIG. 3, display 18, spacer 26, protection circuit 25, and membrane 28 are not shown.

Printed circuit 22 comprises conductive tracks 31, for example, made of copper, on the side of surface 23. In FIG. 3, the conductive tracks have been shown by ellipses 31, especially forming switches. A switch corresponds, for example, to the separate ends of two conductive tracks. The ends of the track forming a switch may have the shape of interdigited combs or, as shown in FIG. 3, the shape of two concentric rings.

A chip card or memory card connector 30 is attached to surface 24 of printed circuit 22. Connector 30 is arranged along one side of printed circuit 22, opposite to opening 21. A protection device 32, corresponding to a cage, covers connector 30 and is attached to printed circuit 22.

Flexible protection circuit 25 may comprise several flexible films between which interconnected conductive tracks forming at least one safety circuit are arranged. The safety circuit is connected at its ends to a processing circuit, provided at the level of printed circuit 22. The processing circuit is capable of detecting the rupture of a conductive track of the safety circuit of protection circuit 25, which may correspond to an unauthorized access. The detection of an unauthorized access may cause the stopping of payment terminal 10, the deleting of critical data stored in a payment terminal 10, etc.

Keyboard membrane 28, for example made of silicone or polyurethane, comprises a base 35 having a surface 36 resting on spacer 26 and a surface 37 oriented towards upper package portion 14. Each key 20 has a substantially parallelepipedal shape and is connected to base 35 by a thinned down peripheral lip 38. Further, each key 20 is continued on the side of surface 36 by a pin 40 which projects substantially perpendicularly to the plane of base 35. Keyboard membrane 28 may further comprise dummy keys 41, a single dummy key 41 being shown in FIG. 4. Each dummy key 41 is connected to base 35 by a thinned down peripheral lip 42. Spacer 26 is crossed by openings 44 intended to receive pins 40 and dummy keys 41. Spacer 26 comprises non-through recesses 50 on the side of surface 23 of printed circuit 22. Flexible protection circuit 25 comprises, at the level of each opening 44, a deformable portion 51. Each deformable portion 51 comprises, on the side of printed circuit 22, a conductive portion 52, for example, a metal region. On printed circuit 22, under each conductive portion 52, two ends, each belonging to a metal track 54, are arranged in front of each other.

In the absence of any external action on the keyboard, each key 20 is distant from the median plane of base 35 and is distant from printed circuit 22. Thereby, deformable portion 51 associated with protection circuit 25 takes on a configuration in which conductive portion 52 is distant from metal tracks 54. When a user exerts a pressure on a key 20, the associated lip 38 enables key 20 to move, to deform deformable portion 51 until conductive portion 52 comes into contact with the ends of the underlying metal tracks 54, then establishing an electric contact between the two metal tracks 54. Key 20, the associated deformable portion 51 and conductive portion 52 thus behave as a switch which is normally off and which is turned on when a user presses key 20.

Dummy keys 41 provided at the keyboard level are not visible from the outside of package 12 and form, with the associated deformable portion 51 and conductive portion 52, a protection device. The conductive portion 52 and conductive tracks 54 associated with a dummy key 41 form a safety circuit connected to a processing circuit, not shown.

When upper package portion 14 is attached to lower package portion 16, dummy key 41 is permanently stressed by upper package portion 14 to bear against the associated deformable portion 51 of protection circuit 25. In this case, the conductive portion 52 associated with dummy key 41 comes into contact with the ends of the two underlying tracks 54. The electric connection between the two conductive tracks 54 is detected by the processing circuit.

When someone tries to access the content of package 12 by removing upper package portion 14, dummy key 41 is no longer stressed by upper package portion 14 and is brought by the action of lip 42 back to an idle position distant from printed circuit 22. The associated deformable portion 51 then takes on a configuration in which conductive portion 52 is distant from underlying tracks 54. The processing circuit is capable of detecting a state modification of the safety circuit, indicating that an opening of terminal 10 has occurred. The associated dummy key 41, deformable portion 51, and conductive portion 52 then behave as a switch which is on when upper package portion 14 is in a normal position and which is off when upper package portion 14 is removed. The detection of an opening of the terminal may cause the stopping of payment terminal 10, the deleting of critical data stored in payment terminal 10, etc.

Cage 32 comprises a generally rectangular planar bottom wall 60 and three generally rectangular planar lateral walls 62, 64, 66 substantially perpendicular to bottom wall 60, only lateral walls 62 and 64 being visible in FIGS. 2 to 4. Each lateral wall 62, 64, and 66 comprises two tabs 68 which extend through openings 70 which cross printed circuit 22. Openings 70 for example correspond to slotted holes having a width on the order of 0.8 mm. Tabs 68 are folded back on surface 23 of printed circuit 22 with which they are attached by solders 71. As visible in FIG. 4, each tab 68 comprises at its end a conductive portion 72, for example, made of copper, attached to a conductive portion 74 provided on surface 23 of printed circuit 22 by a portion 76 of a soldering material, for example, solder paste. Flexible protection circuit 25 covers each tab portion 68 folded back on surface 23 of printed circuit 22.

Figure 5:
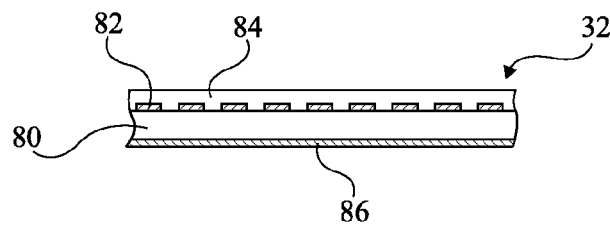
FIG. 5 is a cross-section view of a detail of a protection device according to an embodiment of the present invention.

FIG. 5 shows a cross-section of walls 60, 62, 64, 66 of cage 32. Cage 32 is formed from a flexible printed circuit for example having a thickness on the order of 0.2 mm. The flexible circuit is formed of a thin flexible core 80, for example, made of polyimide, on a surface of which one or several conductive tracks 82, for example, made of copper, are distributed. Conductive tracks 82 zigzags all over the bottom wall 60 and lateral walls 62, 64, 66. Thin flexible core 80 is covered with an insulating varnish layer 84 on the side of conductive tracks 82. A conductive layer 86, for example, made of copper, is provided on the surface of core 80 opposite to conductive tracks 82. Conductive track(s) 82 are connected to a processing system provided at the level of printed circuit 22. For this purpose, each conductive track 82 is connected at its ends to conductive portions 72 arranged at the end of tabs 68, thus ensuring the electric connection of conductive track 82 to printed circuit 22. Flexible protection circuit 25 may have a structure similar to that shown in FIG. 5, and conductive 86 may be omitted.

When cage 32 is connected to printed circuit 22, conductive track(s) 82 form a safety circuit connected at its ends to the processing system provided at the level of printed circuit 22. The processing system is capable of detecting an interruption of conductive tracks 82, which may correspond to an unauthorized access to connector 30. As an example, an interruption of conductive tracks 82 occurs in the event of an attempt to remove cage 32 or to drill said cage. The detection of an unauthorized access may stop payment terminal 10, delete critical data stored in payment terminal 10, etc.

In operation, since connection solders 71 between tabs 68 and printed circuit 22 being located on the side of surface 23, they are protected both by flexible protection circuit 25 and by the protection device associated with membrane 28 formed of dummy keys 41. An unauthorized access to solders 71 is thus detected via dummy keys 41 of membrane 28 and/or via flexible protection circuit 25. Further, conductive layer 86 being an opaque layer, it prevents an individual from guessing, by transparency, the position of conductive tracks 82 on walls 60, 62, 64, 66 of cage 32. Conductive layer 86 may further be used as a shielding of connector 30 against electromagnetic disturbances.

The present invention further enables to ease maintenance operations. Indeed, tabs 68 may be unsoldered from printed circuit 22 to remove cage 32 without requiring the removal of connector 30.

As a variation, there may be no protection circuit 25. Conductive portions 52 can then be directly provided on pin 40 and dummy key 41. Connection solders 71 between tabs 68 and printed circuit 22 are then only protected by the protection device associated with membrane 28 and formed of dummy keys 41. According to another variation, dummy keys 41 are not present. Connection solders 71 between tabs 68 and printed circuit 22 are then only protected by flexible protection circuit 25.

Figure 6:
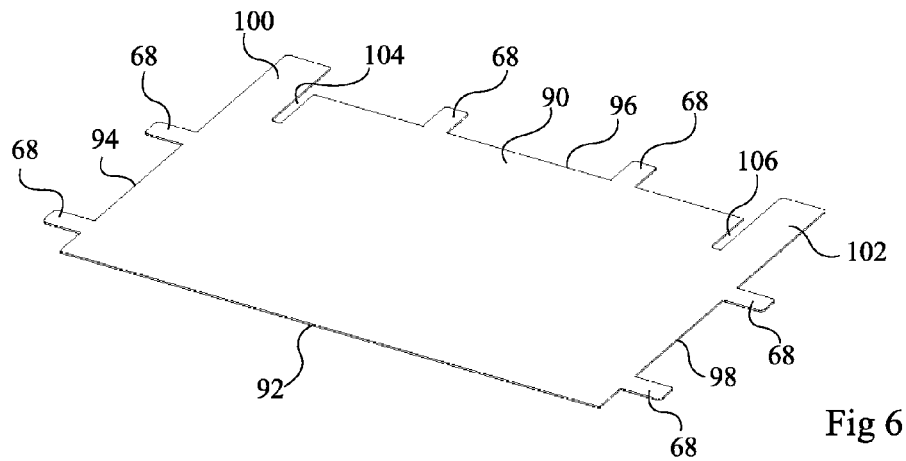
FIGS. 6 to 8 illustrate successive steps of the assembly of the protection device of FIGS. 2 to 5 on a printed circuit.
Figure 7:
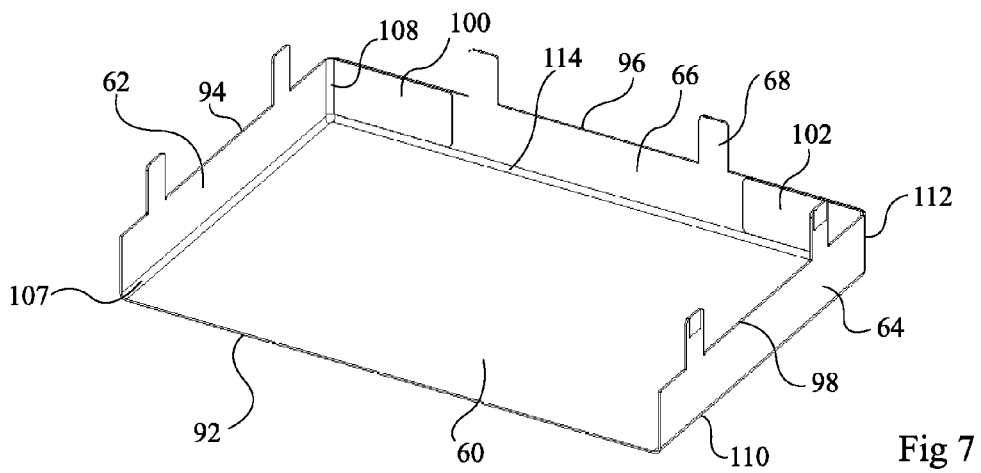
Figure 8:
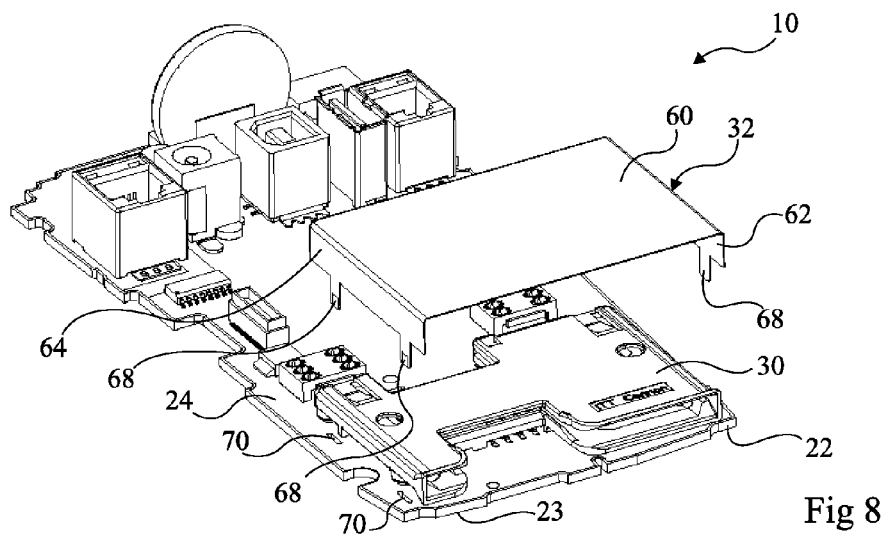

FIGS. 6 to 8 are perspective views illustrating successive steps of an example of a method of assembly of protection device 32 on printed circuit 22.

FIG. 6 shows an example of a planar flexible printed circuit 90 used to form cage 32. Flexible printed circuit 90 has a generally rectangular shape with four sides 92, 94, 96, 98. The two tabs 68 project on each side 94, 96, 98. Side 92 comprises no tab 68. Circuit 90 further comprises, at the level of the two corners joining sides 94, 98 to side 96, two portions 100, 102 being continued beyond side 96. Further, two openings 104, 106 are provided in flexible printed circuit 90 and extend from side 96 in a direction parallel to sides 94 and 98 to delimit portions 100, 102.

FIG. 7 shows cage 32 formed by folding of flexible printed circuit 90. A first folding 107 is parallel to side 94 in continuation of opening 104. A second folding 108 is formed perpendicularly to side 94 at the end of opening 104. Foldings 107 and 108 delimit lateral wall 62. A third folding 110 is formed in a direction parallel to side 98 in continuation of opening 106. A fourth folding 112 is formed perpendicularly to side 98 at the end of opening 106. Foldings 110 and 112 delimit lateral wall 64. A fifth folding 114 is formed in a direction parallel to side 96 and connects the ends of openings 104 and 106. Folding 114 delimits lateral wall 66. Foldings 107, 110, and 114 delimit bottom wall 60. Portions 100, 102 are glued to bottom wall 66 and are located on the side of bottom wall 66 oriented towards the inside of cage 32. Portions 100, 102 ensure the closing of cage 32 at the level of the common sides between walls 62, 64, 66.

As a variation, portions 100, 102 are continued by fingers which partially follow the shape of tabs 68 of wall 66. The fingers penetrate into openings 70 in the assembly of cage 32 on printed circuit 22. Due to these fingers, an attempt of intrusion which would consist of removing portions 100, 102 to have access to connector 30 from the common side, thus disengaged, between walls 62, 64 and wall 66, becomes more difficult.

As another alternative, portions 100 and 102 are extensions of wall 66 and are folded against walls 62 and 64.

Further an rigidizing element can be added along side wall 66.

FIG. 8 is a bottom view of printed circuit 22, before cage 32 has been assembled on it. Solder paste is distributed on surface 23 of printed circuit 22 at the locations where tabs 68 must be soldered to printed circuit 22, that is, at the level of conductive portions 74 (FIG. 4). The assembly of cage 32 on printed circuit 22 is performed by introducing tabs 68 into the corresponding openings 70 provided at the level of printed circuit 22. This enables to ensure a proper positioning of protection device 32 with respect to printed circuit 22. Tabs 68 are then folded back on surface 23 of printed circuit 22, with conductive portions 72 at the ends of tabs 68 coming into contact with the solder paste. Protection device 32 is then manually or automatically soldered to printed circuit 22 by local heating of the ends of tabs 68 to melt the solder paste portions. As an example, the heating of the ends of tabs is performed by a soldering iron. In this case, it is possible to provide on the surface of each tab 68 opposite to conductive portion 72 a conductive portion, for example, made of copper, on which the soldering iron is applied to improve the heat transfer to the solder paste.

Figure 9:
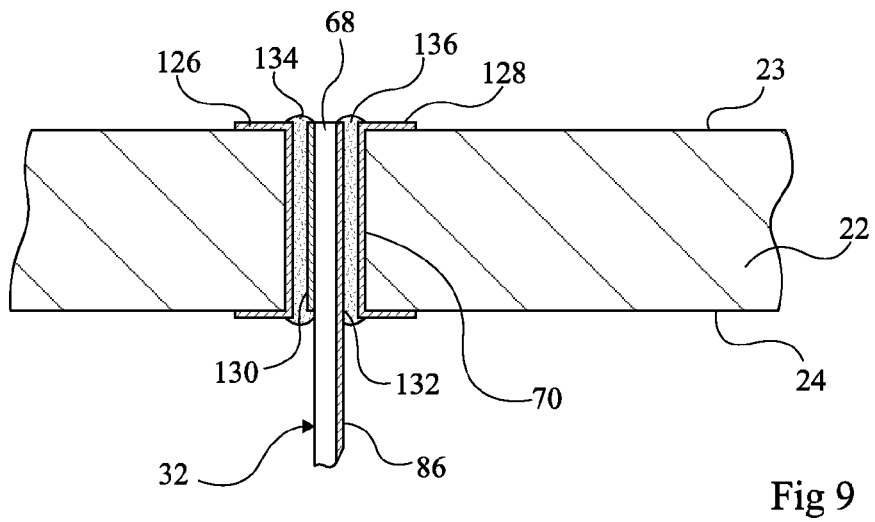
FIGS. 9 and 10 respectively are simplified cross-section and top views of the connection of a protection device according to another embodiment of the present invention to a printed circuit.
Figure 10:
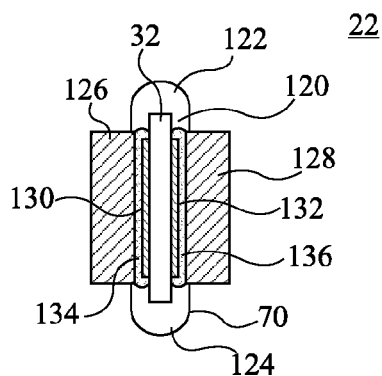

FIGS. 9 and 10 respectively are a simplified cross-section view and a simplified top view of protection device 32 according to another embodiment of the present invention at the level of the connection between protection device 32 and printed circuit 22. Protection 32 is shown in simplified manner on this drawing. In particular, conductive tracks 82 are not shown. In the present embodiment, each tab 68 of the protection device penetrates into the corresponding opening 70 but does not protrude or only slightly does so on the side of surface 23 of printed circuit 22.

As more clearly appears from the top view, opening 70 comprises an elongated central region 120 and two end regions 122, 124. Conductive portions 126, 128, for example, made of copper, extend on the opposite walls of central region 120 of the opening and are continued on the side of surfaces 23 and 24 of printed circuit 22. There is no metal portion in opening 70 at the level of end regions 122, 124. Tab 68 of cage 32 comprises conductive portions 130, 132 on each surface. Conductive portion 130 may be connected to conductive portions 82 of cage 32 and conductive portion 132 may be connected to conductive layer 86. A portion 134 of a conductive material, for example, a solder paste, is arranged between conductive portions 126 and 130. Another portion 136 of the conductive material is arranged between conductive portions 128 and 132. Solder paste portion 134 ensures an electric connection between conductive portions 126 and 130 and solder paste portion 136 ensures an electric connection between conductive portions 128 and 132. Solder paste portions 134, 136 are separate so that there is no electric connection between conductive portions 130 and 132. Solder paste portions 134, 136 further maintain tab 68 in place. As a variation, tab 68 may be folded back in opening 70.

Figure 11:
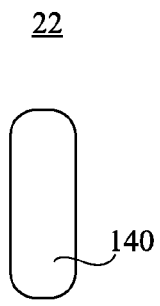
FIGS. 11 to 13 illustrate successive steps of the forming of an opening used to connect the protection device of FIGS. 9 and 10 to a printed circuit.
Figure 12:
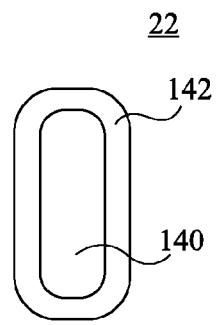
Figure 13:
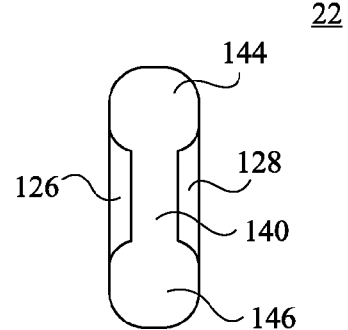

FIGS. 11 to 13 are top views of printed circuit 22 at successive steps of the forming of opening 70.

FIG. 11 shows printed circuit 22 after having drilled a slotted opening 140 crossing printed circuit 22.

FIG. 12 shows printed circuit 22 after having covered all the walls of opening 140 with a conductive layer 142, for example made of copper. Conductive layer 142 extends in opening 140 and on surfaces 23 and 24 of printed circuit 22 across the entire periphery of opening 140.

FIG. 13 shows printed circuit 22 after the drilling of two openings 144, 146, for example, circular, at the ends of slotted opening 140. The drilling of openings 144, 146 delimits the two conductive portions 126 and 128.

Of course, the present invention is likely to have various alterations and modifications which will readily occur to those skilled in the art. In particular, although in the previously-described embodiments cage 32 is formed of four walls, it should be clear that cage 32 may be formed of a different number of walls. Further, although in the previously-described embodiments cage 32 is formed by folding of a flexible printed circuit, cage 32 may be formed by drawing of a flexible printed circuit, or by any other method enabling to form a three-dimensional printed circuit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An electronic system comprising:
a printed circuit having first and second opposite surfaces and at least one through opening;
an electronic component attached to the second surface;
a first device of protection against access attempts on the first surface side;
a second protection device at least partially covering, on the second surface side, the electronic component, and comprising at least one tab extending in the through opening and attached to the printed circuit, said electronic component being distinct from said first and second protection devices, said tab comprising at least one conductive portion electrically contacting at least one first conductive track of the first surface,
wherein the second protection device comprises at least one second conductive track connected to the first conductive track at the tab, and
wherein the tab protrudes from the opening on the side of the first surface, is folded back against the first surface and is attached to the first surface at one end.

2. The system of claim 1, wherein the tab is attached to the walls of the opening.

3. The system of claim 1, wherein the second protection device comprises at least one flexible film comprising third and fourth opposite surfaces, the third surface being oriented towards the electronic component, the second conductive track being arranged on the third surface.

4. The system of claim 3, wherein the second protection device comprises a conductive layer covering the fourth surface.

5. The system of claim 1, wherein the first protection device comprises an additional flexible film at least partially covering the first surface of the printed circuit and at least one third conductive track extending on the additional flexible film at least at the mounting between the tab and the printed circuit, the printed circuit comprising at least one fourth conductive track, the third conductive track being connected to the fourth conductive track.

6. The system of claim 1, wherein the printed circuit and the first and second protection devices are contained in a package and wherein the first protection device comprises a mobile or deformable element comprising a first conductive portion, the printed circuit comprising second and third conductive portions at least partially facing the first conductive portion, the mobile element being configured to be moved or deformed between a first position, in the presence of the package, in which the first conductive portion is in contact with the second and third conductive portions and a second position, when the package is at least partially open, in which the contact between the first conductive portion and the second and third conductive portions is interrupted.

7. The system of claim 1, wherein the system is an electronic payment terminal.

8. A method for manufacturing the electronic system of claim 1, comprising the steps of:
- forming the second protection device;
- attaching the electronic component to the second surface of the printed circuit;
- placing the second protection device on the second surface by introducing the tab into the opening, the second protection device at least partially covering the electronic component;
- attaching the tab to the printed circuit on the side of the first surface; and
- placing the first protection device on the first surface side.

9. The method of claim 8, wherein the step of forming the second protection device is carried out by folding of a flexible printed circuit.

* * * * *